Sept. 28, 1971 P. PILAT 3,608,271
COIN WRAPPING MACHINE
Filed Sept. 12, 1968 11 Sheets-Sheet 1
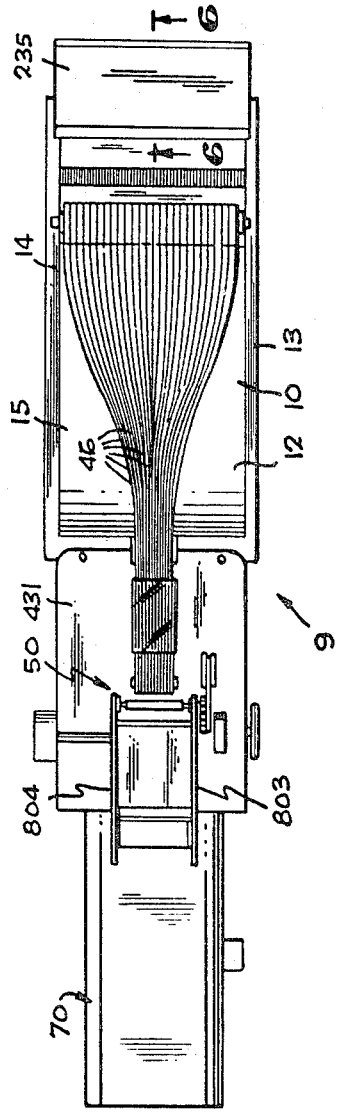
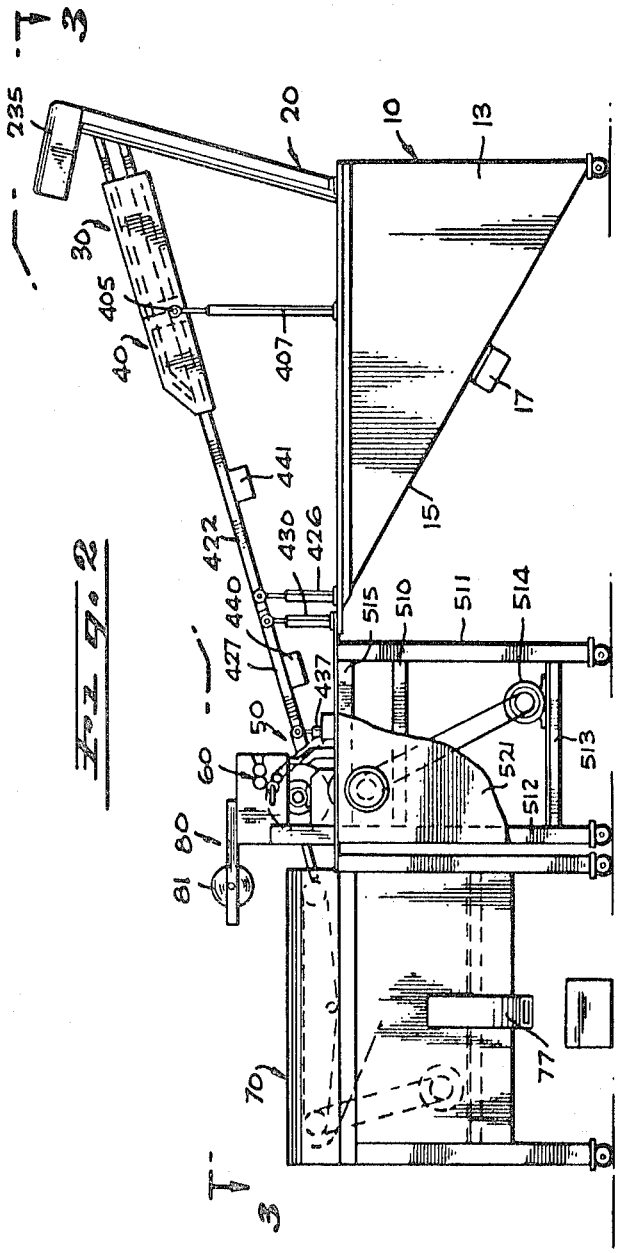
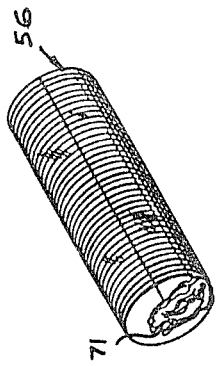
INVENTOR
PETER PILAT

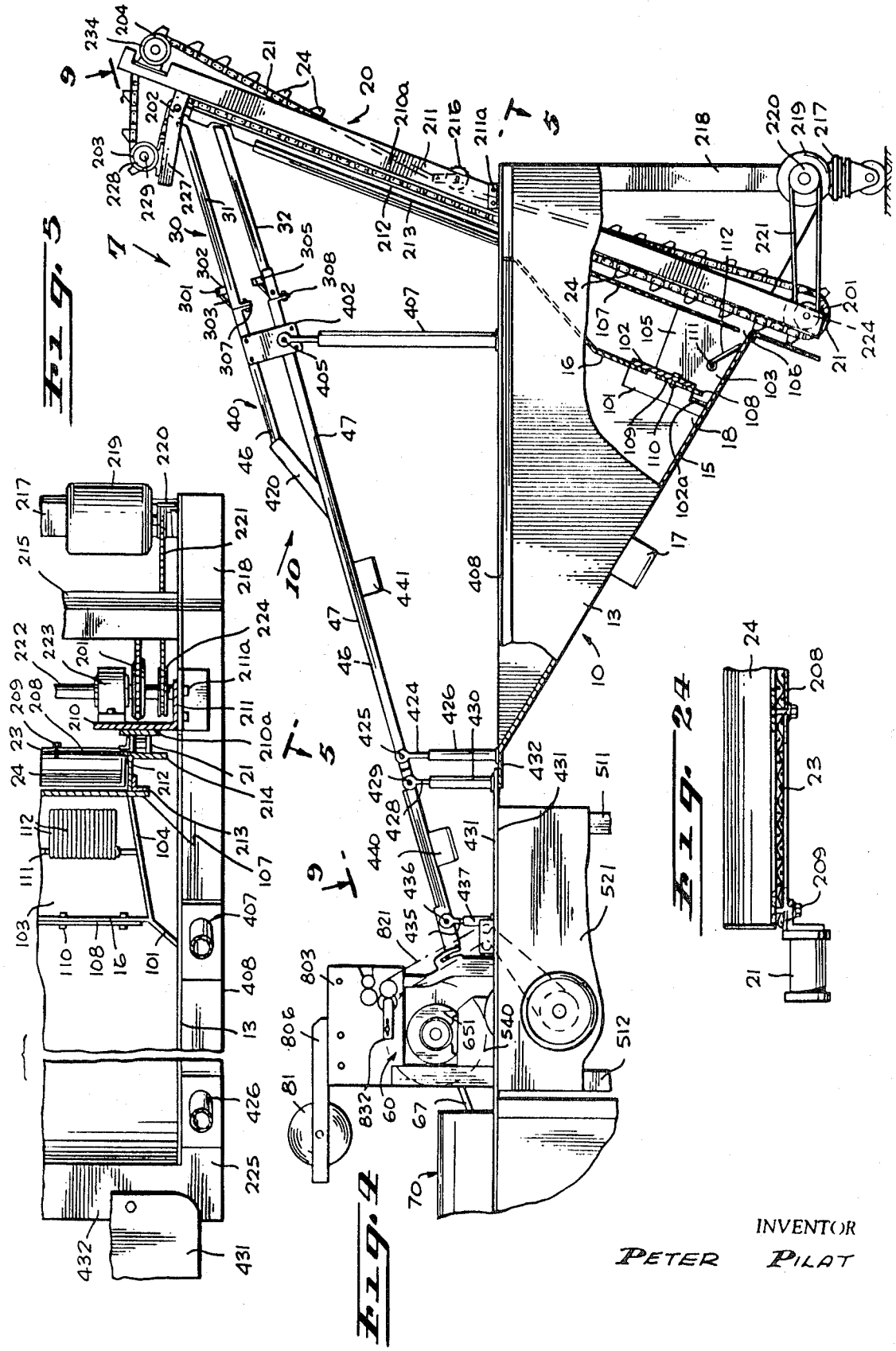

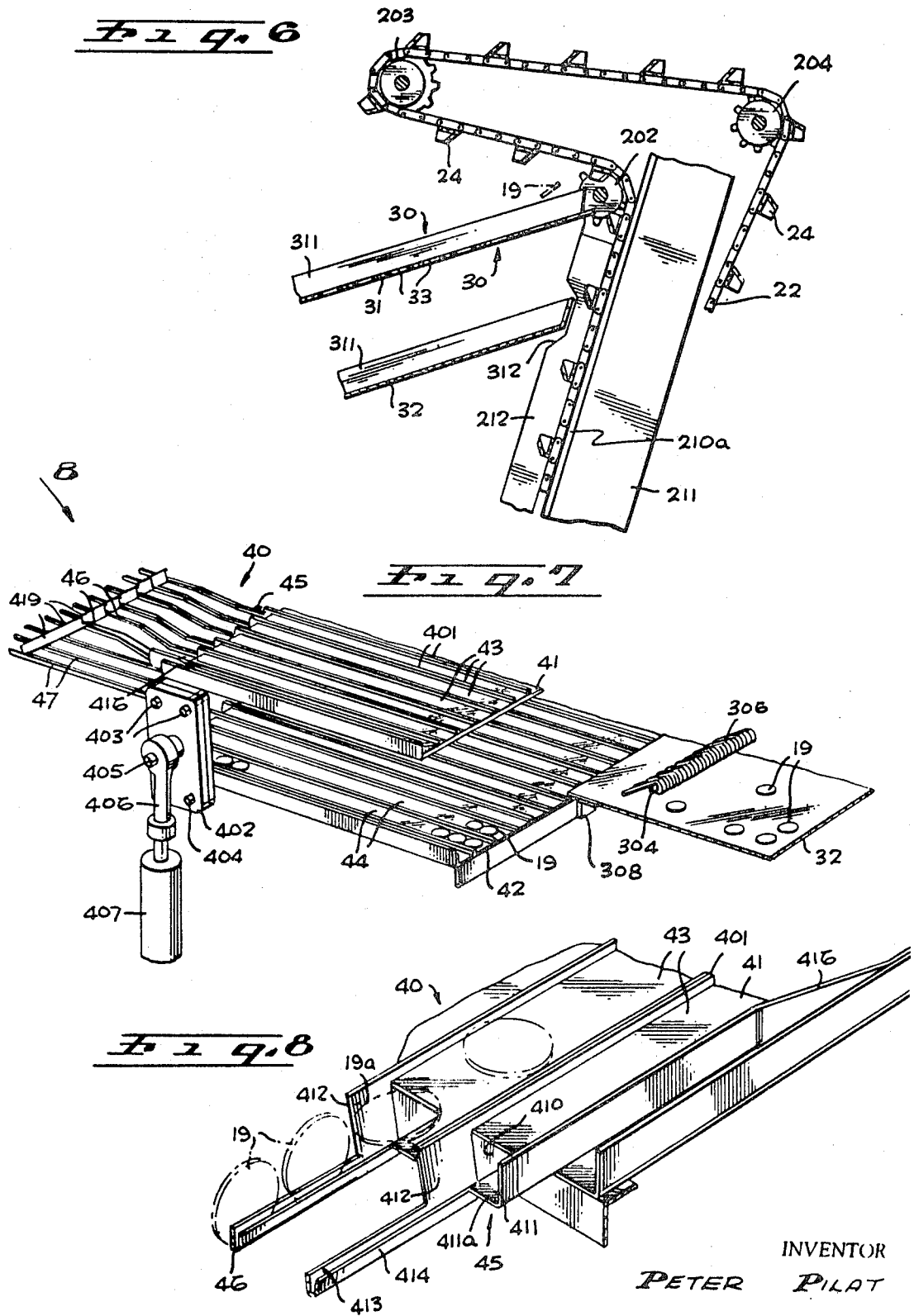

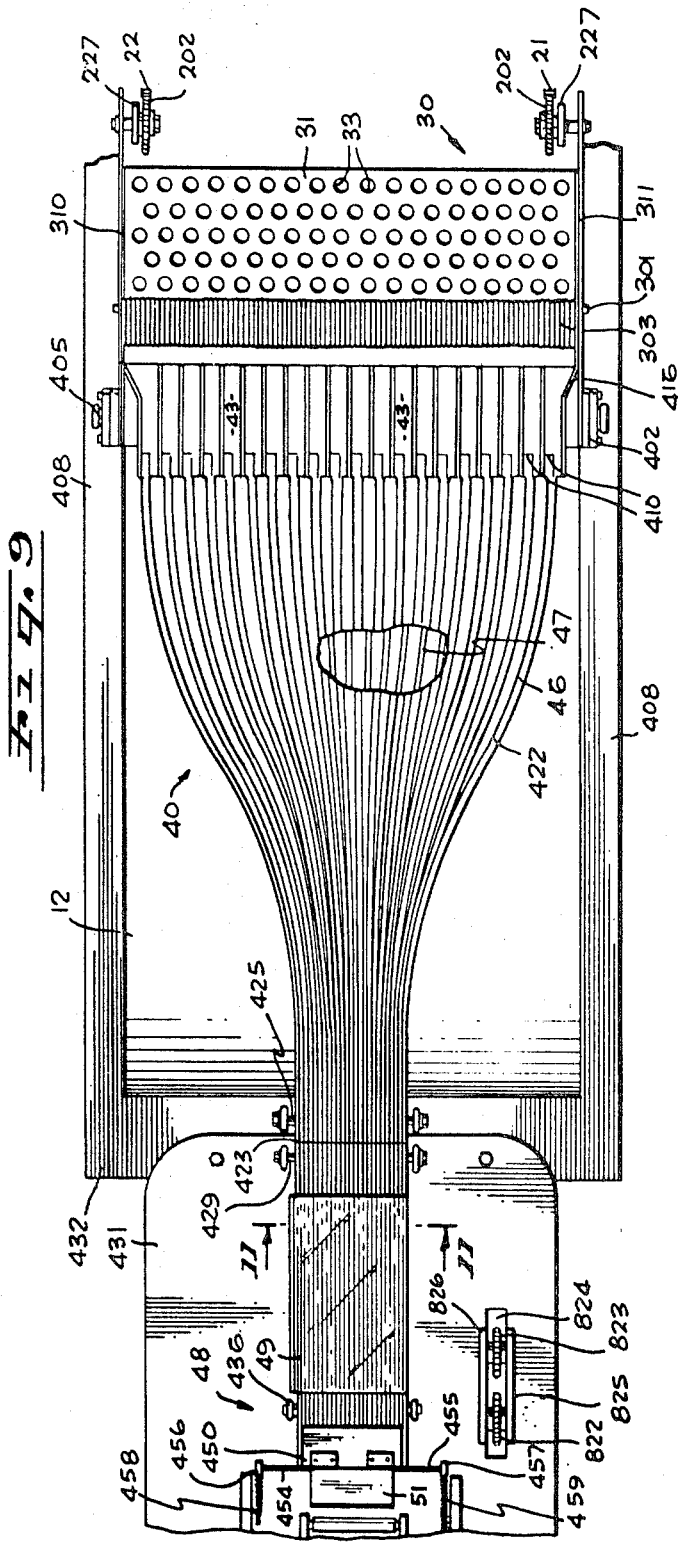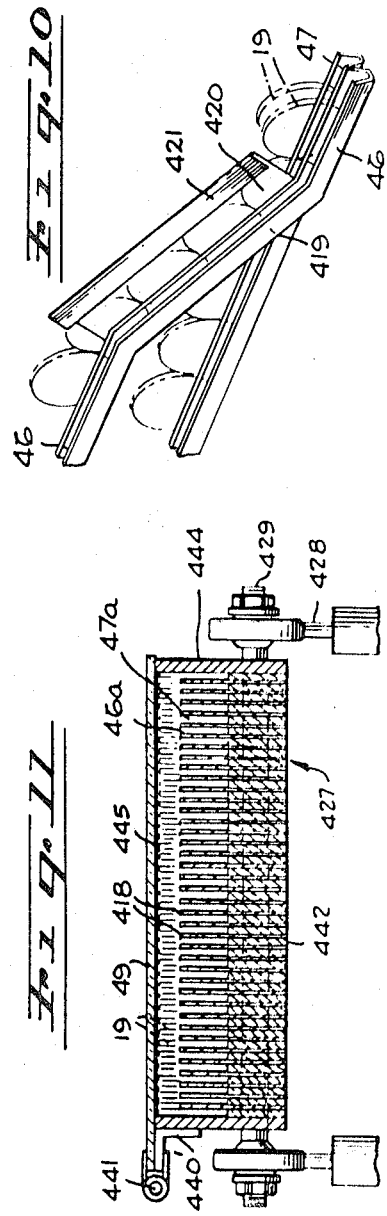

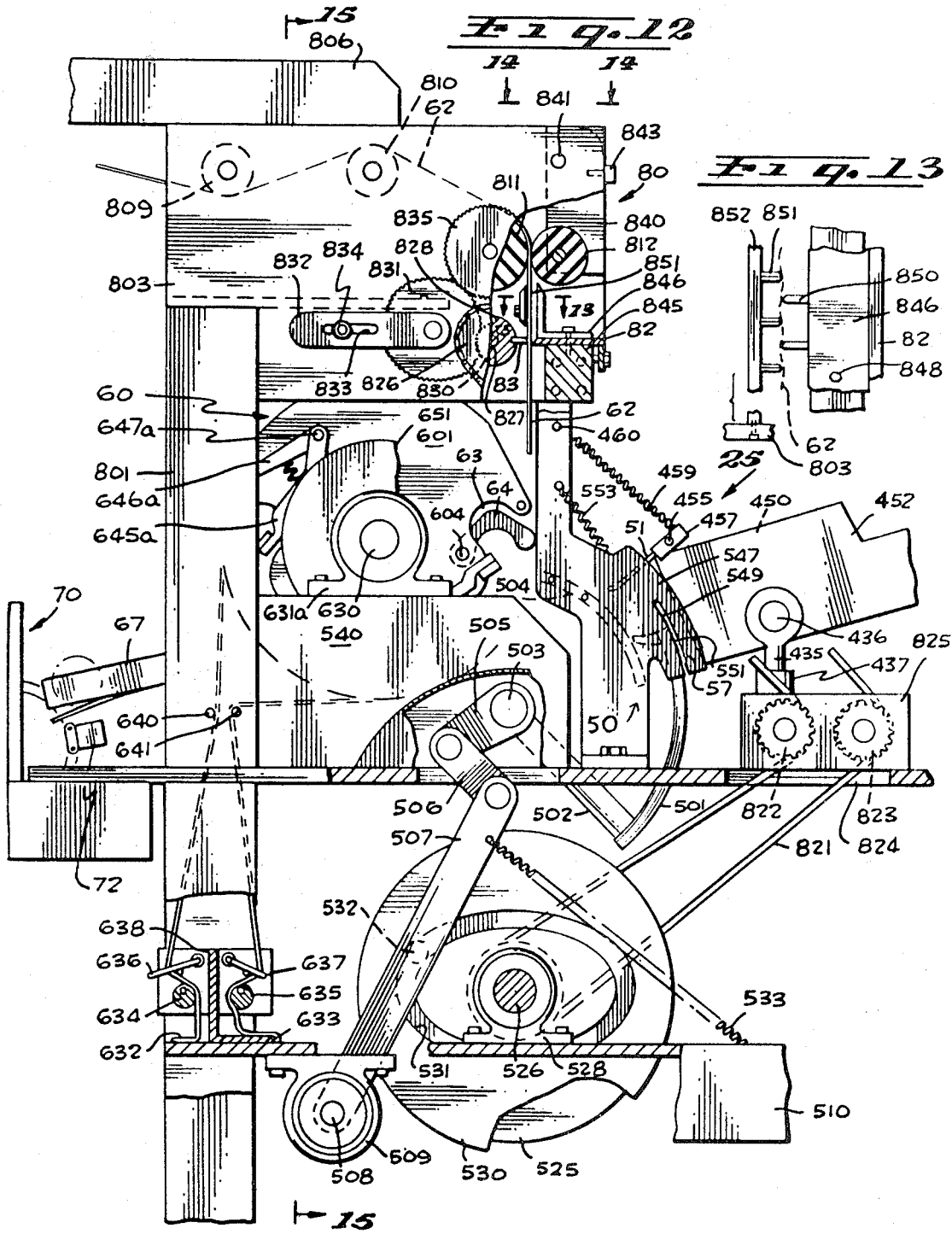

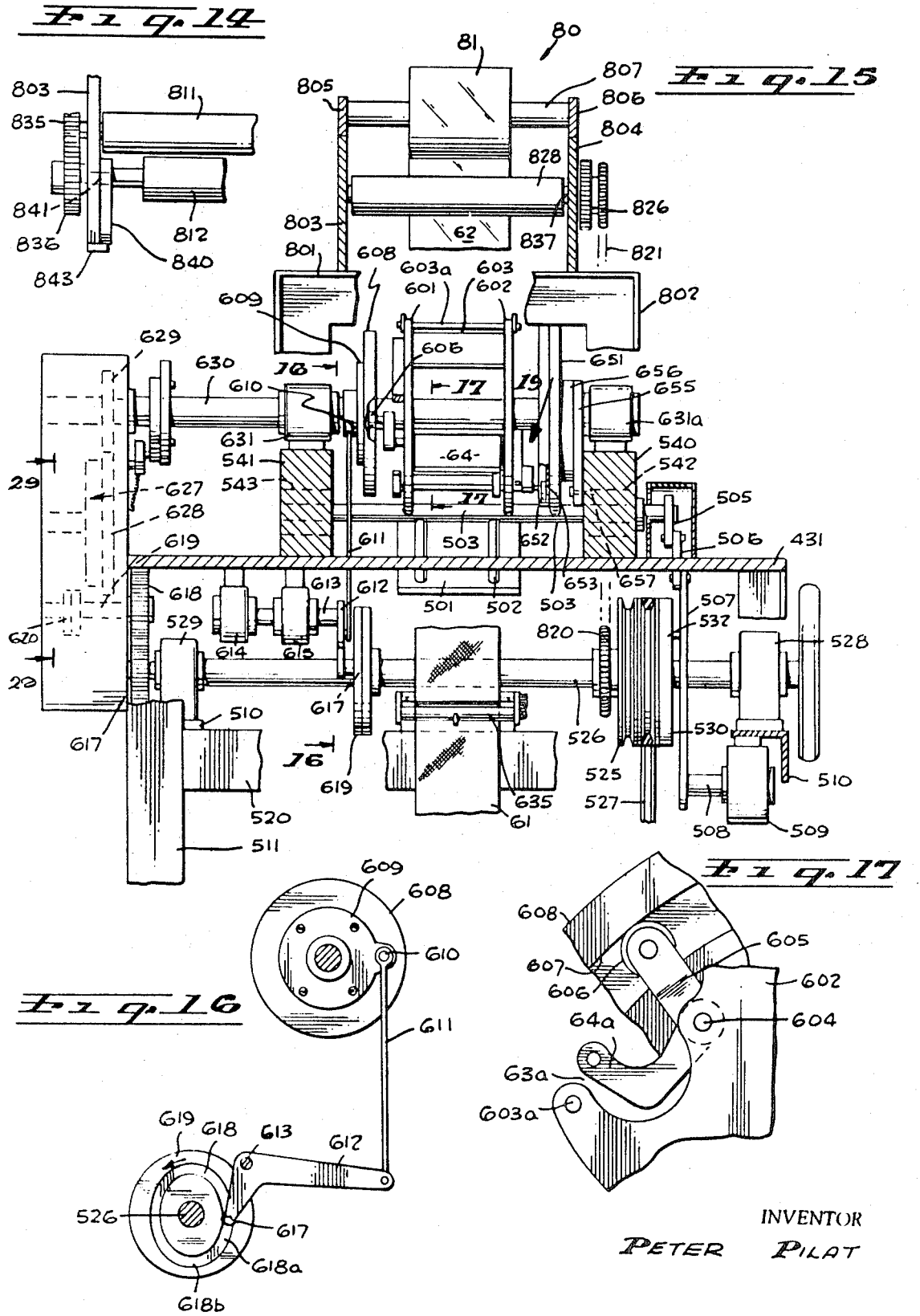

INVENTOR
PETER PILAT

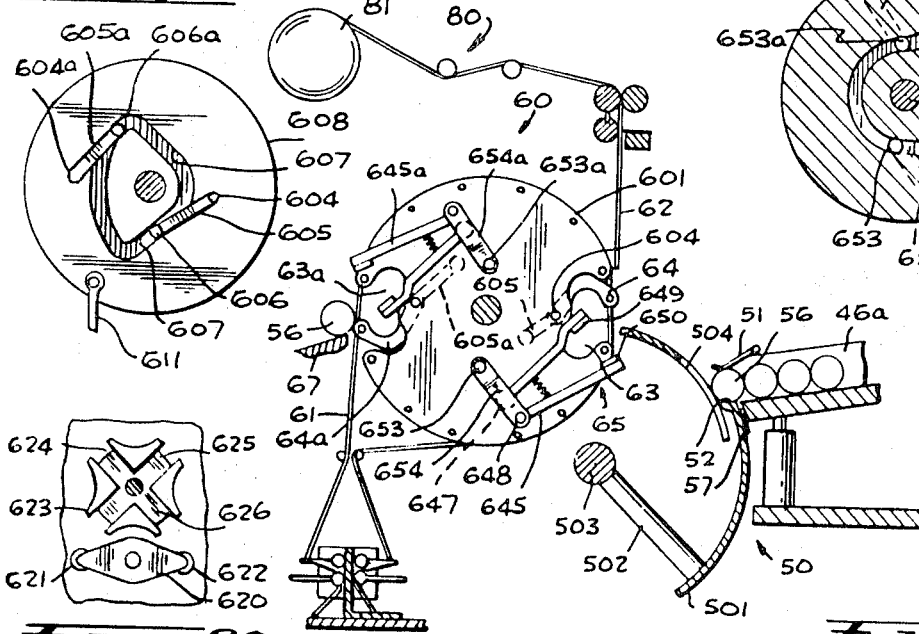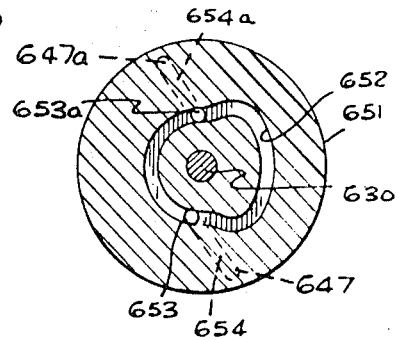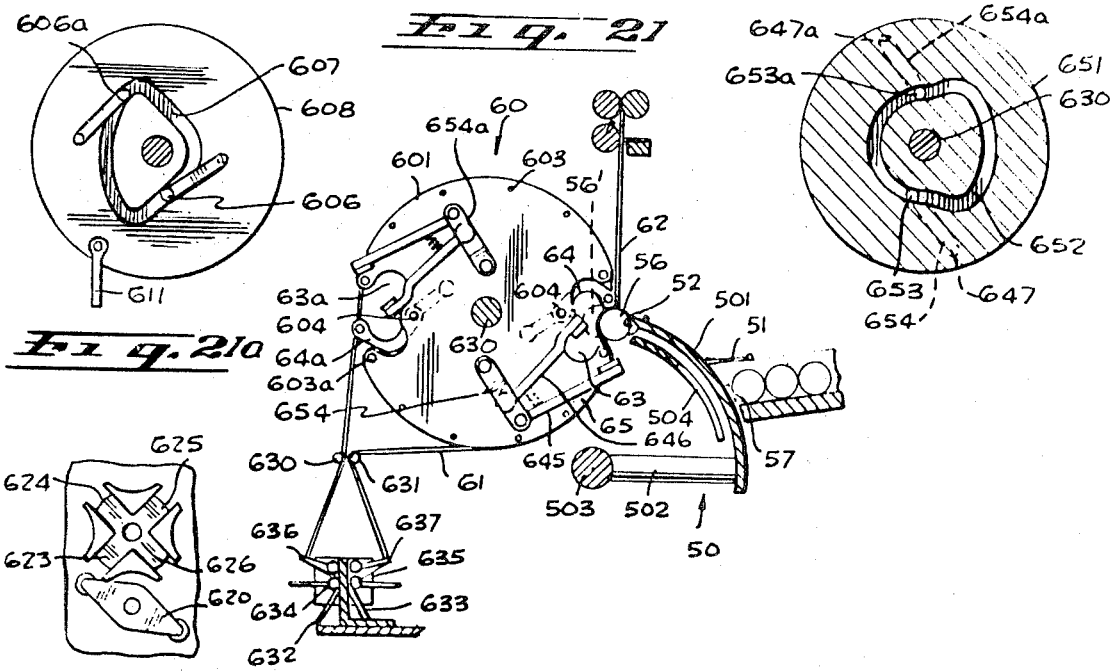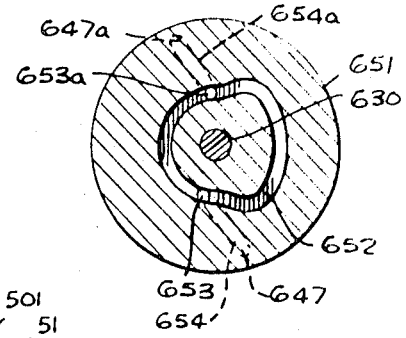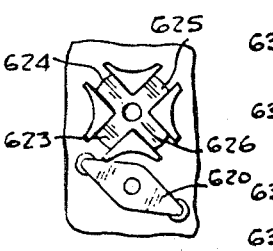

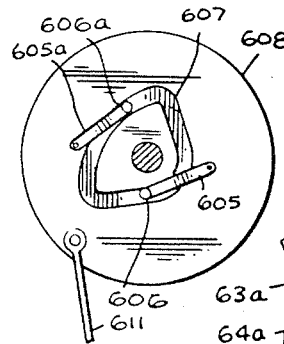
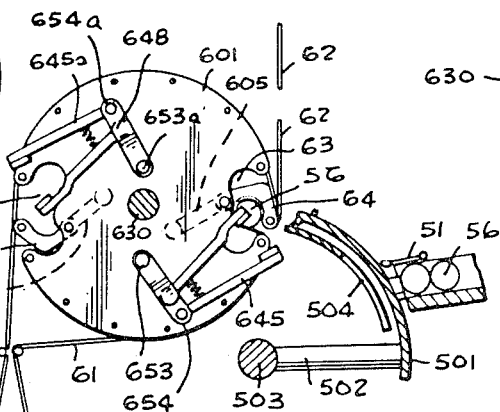
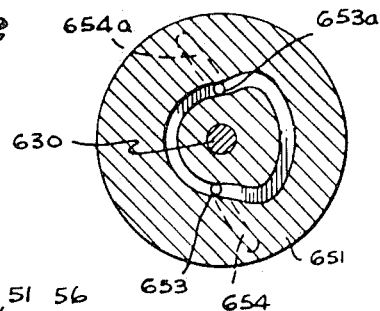
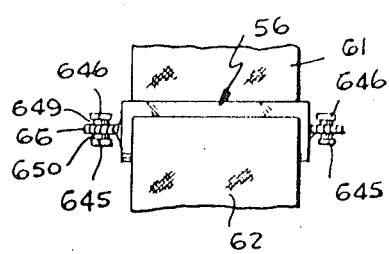
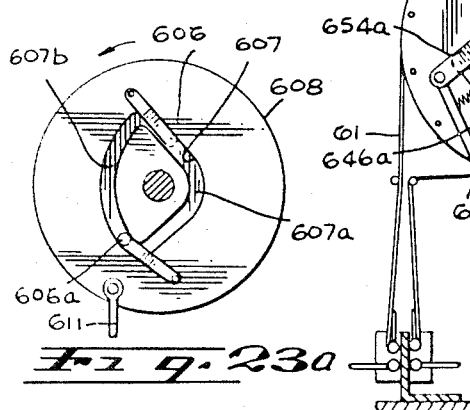
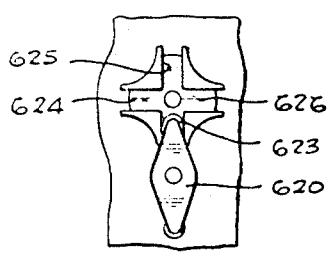

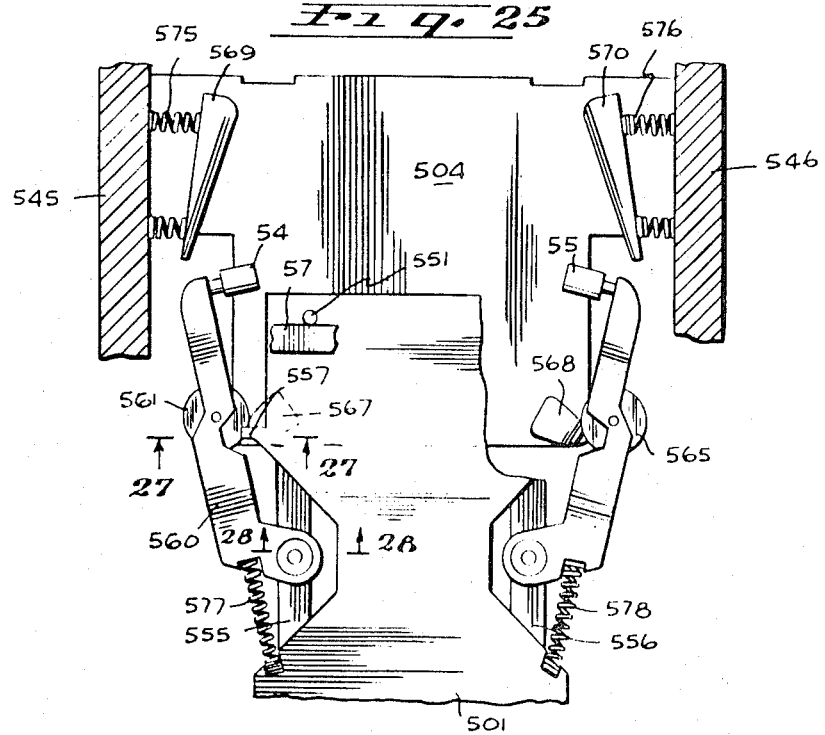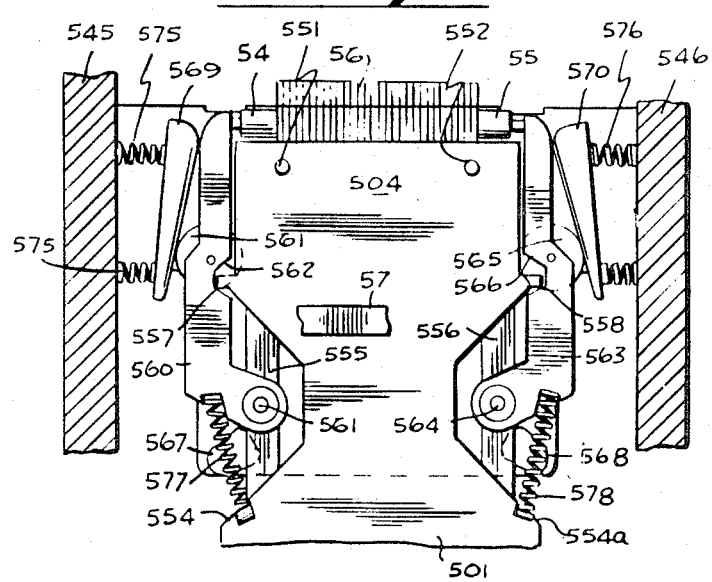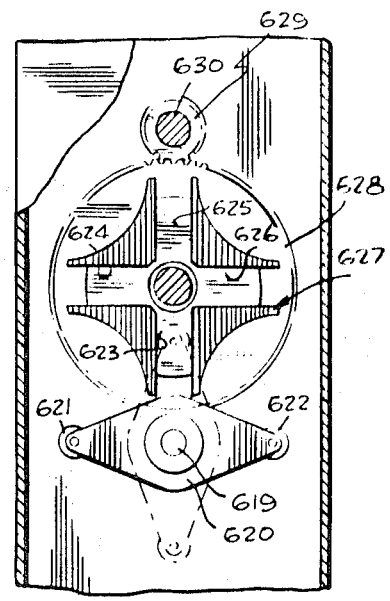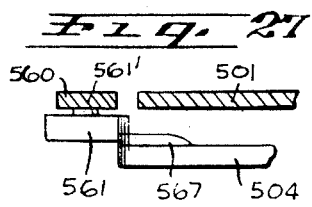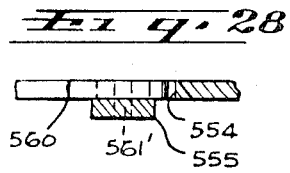
INVENTOR
PETER PILAT

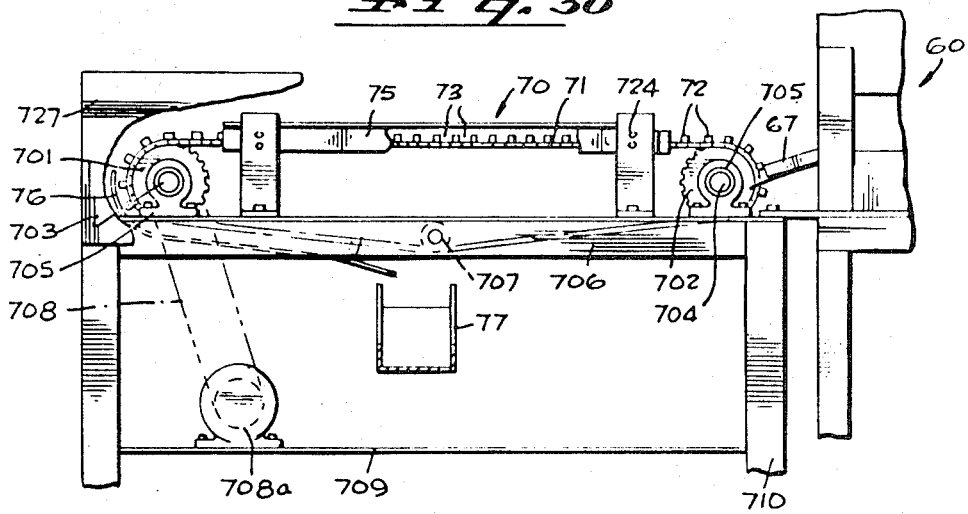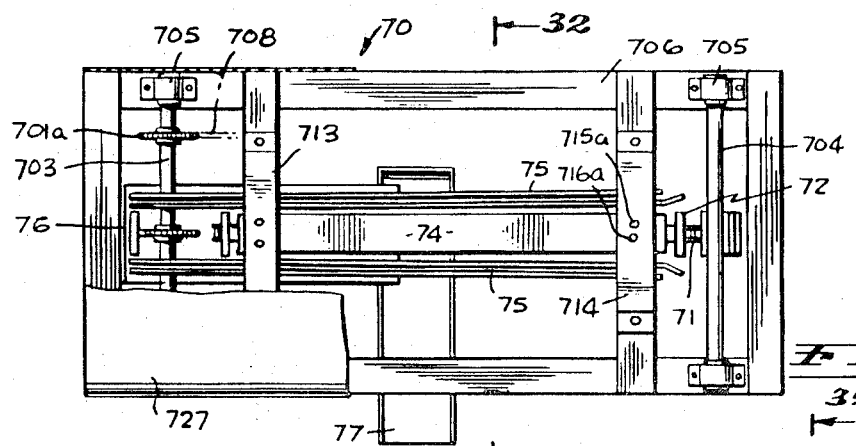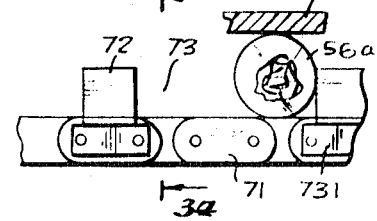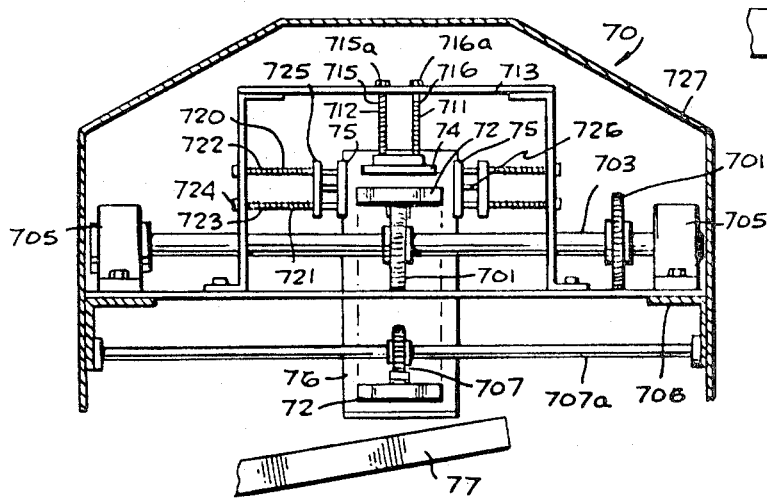

United States Patent Office

3,608,271
Patented Sept. 28, 1971

---

3,608,271
COIN WRAPPING MACHINE
Peter Pilat, Rockaway, N.J., assignor to Broach Systems, Inc., Little Ferry, N.J.
Filed Sept. 12, 1968, Ser. No. 759,322
Int. Cl. B65b *11/34;* G07d *9/00*
U.S. Cl. 53—212                                    18 Claims

ABSTRACT OF THE DISCLOSURE

A machine is disclosed preferably for wrapping coins, and includes a conveyor and inclined plate means for assembling a plurality of coins on edge adjacent one another to form a roll of loose coins, and means for moving the roll of loose coins away from the area where the coins were assembled. Coin wrapping means are provided for receiving the roll of loose coins and thereafter wrapping a sheet of film material around the loose coins. This coin wrapping means includes a wrapping head having at least one cavity therein, an extensible belt substantially surrounding the head, means for placing the sheet between the belt and the loose roll of coins, means for urging the roll of coins against the sheet and into the cavity, and means for rotating the wrapping head relative to the belt after receiving the coin roll to wrap the sheet around the coin roll.

The machine may also include a gripping means for holding the roll of loose coins at its end as the coins move as a roll into the wrapping head, means operatively coupled to the gripping means for separating the gripping means from the roll of coins after the coin roll has been urged against the sheet and belt into the cavity, and jaw means pivotally located on the wrapping head for holding the roll within the cavity. Once the coin roll has been wrapped a heat sealing means may be provided to seal the film about the coin roll.

---

This invention relates to a coin wrapping machine and more particularly to a coin wrapping machine in which all of the individual coins of a roll are assembled into a roll at the same time and are then wrapped with a plastic film which is sealed at its ends.

A present type of coin wrapping machine utilizes a spinning hopper which separates the coins by throwing them to the outside of the hopper and the coins drop one at a time down a chute on top of each other until a roll is formed. Thus, it is necessary to wait until forty or fifty coins have been separated and dropped individually one on top of the other. The coins are dropped into preformed cartridges and the cartridges released from the roll forming machine either by hand or automatically. Thereafter, the open end of the cartridge is crimped by a crimping machine to close the cartridge. The cartridges are unnecessarily bulky at their ends and unnecessarily consume space and handling time before being packaged with coins.

In the present invention, each roll of coins is assembled all at once for wrapping and it is unnecessary to wait for individual coins to stack until the necessary coins are accumulated. The coins to be wrapped are placed in a hopper and fed to an upright conveyor. The conveyor has buckets which lift the coins from the hopper onto a feeding plate where they are distributed to two or more ribbed plates which are separated into channels for separating the coins into rows. Each of the channels feeds into a coin turning mechanism which moves the coins from horizontal position to vertical position so that the coins thereafter move forward through the coin track on edge. All of the coin tracks for a roll are directed side by side to a roll forming location so that the total number of coins required in a row is quickly collected. After a roll has been collected, the full roll is moved into a wrapping head where the roll of coins is wrapped by a thin plastic film by rolling the coin roll with a canvas belt passing through a cavity in the wrapping head. As the roll is being wrapped, the ends of the plastic film are gripped by fingers which hold the ends while the film and roll are rotated, thereby twisting the ends of the wrapping film in order to form a closed film about the coins. After the ends are twisted, the roll is introduced to a heat sealing device which heat seals each of the twisted ends and the roll is finally discharged in a sealed condition. The heat sealing of the ends of the film give a tamper proof seal, and the cellophane or plastic film which is wrapped around the roll of coins provides minimum bulk of wrapper, thereby reducing the storage problem for the coins. Further, since a single roll is formed all at once by moving coins on edge into a single location where they can be assembled as a complete roll, speed with which the coins can be wrapped into rolls is increased many fold to thereby reduce the amount of time the coins must remain in storage or in processing from receipt to redistribution. Since the film is supplied to the machine directly from a film roll, the storage and handling of preformed cartridges as presently required, is eliminated.

It is therefore an object of the present invention to provide a coin wrapping machine which forms a roll of coins all at once and thereafter wraps the roll in a thin plastic film to provide a wrap with minimum bulk.

Another object of the invention is to provide a coin wrapping machine in which the coins are moved from a hopper to a chute by a conveyor which keeps a constant flow of coins in the coin chute in order to keep the wrapping portion of the machine supplied with coin rolls.

Another object of the invention is to provide the novel coin gathering device which takes the coins from the coin chute, separates them into rows and thereafter turns the coins in the individual rows on edge so that they can be moved toward a roll forming position; the roll being formed by a plurality of coins arriving on edge at the same location at the same time.

A further object of the present invention is to provide a coin wrapping machine in which a roll of coins is placed into a cavity in a wrapping head and against a thin film covering a canvas belt; the rotation of the wrapping head causing the film to wrap around the coin in a tight condition.

A further object of this invention is to provide a coin wrapping machine in which a thin film of plastic is wrapped around a roll of coins while the ends of the film are held in order to twist the film at the ends; the twisted ends thereafter being heat sealed to form a tamper proof seal and strong tight roll.

Another object of the invention is to provide a coin wrapping machine in which coins are formed into rolls and wrapped with a thin plastic film so that the roll consumes minimum of space and the amount of time the coins are tied up in processing is reduced to a minimum.

These and other objects of the invention not specifically set forth above will become readily apparent from the accompanying description and drawings in which:

FIG. 1 is a perspective view of a roll of coins wrapped by the machine of the present invention and showing the twisted, heat sealed, plastic film at one end;

FIG. 2 is a side elevational view of the complete coin wrapping machine;

FIG. 3 is a top plan view along line 3—3 of FIG. 2 showing the complete coin wrapping machine;

FIG. 4 is an enlarged, side elevational view similar to FIG. 2 and partly in section and illustrating the hopper and conveyor for the coins;

FIG. 5 is a transverse section along line 5—5 of FIG. 4 showing the hopper and the conveyor buckets attached to the conveyor chains;

FIG. 6 is a partial sectional view along line 6—6 to FIG. 3 showing the path followed by the conveyor buckets;

FIG. 7 is a partial perspective view in the direction of arrow 7 of FIG. 4 showing the coin chute and coin turning section;

FIG. 8 is an enlarged perspective view taken in the direction of the arrow 8 of FIG. 7 and showing the coin turning portion;

FIG. 9 is an enlarged partial top plan view similar to FIG. 3 showing the tracks for conveying the coins to the row forming location;

FIG. 10 is a partial perspective view in a direction of arrow 10 of FIG. 4 showing the manner in which the coins from each of the coin turning portions are fed on edge into side by side tracks at the same elevation;

FIG. 11 is a vertical section along line 11—11 of FIG. 9 showing the coin tracks at the roll forming location;

FIG. 12 is an enlarged side elevational view partly in section, of the coin raising mechanism and the coin wrapping head;

FIG. 13 is a view along line 13—13 of FIG. 12 showing the pleaters for the plastic film;

FIG. 14 is a view along line 14—14 of FIG. 12 showing the mounting for the plastic film drive rollers;

FIG. 15 is a transverse section along line 15—15 of FIG. 12 showing the drive system for the wrapping machine;

FIG. 16 is an elevational view along line 16—16 of FIG. 15 illustrating the cam mechanism for controlling the jaws of the wrapping head;

FIG. 17 is an elevational view along line 17—17 of FIG. 15 showing the cam track and cam roller for moving a jaw of the wrapping head;

FIG. 20 is a schematic illustration of the wrapping head and coin raising mechanism as the raising mechanism starts to load a roll of coins into the wrapping head;

FIG. 20a is a schematic illustration showing the position of the jaw cam and cam follower corresponding to the position of the parts in FIG. 20;

FIG. 20b is a schematic illustration showing the position of the finger cam and cam follower corresponding to the position of the parts in FIG. 20;

FIG. 20c is a schematic illustration showing the position of the Geneva drive for the wrapping head corresponding to the position of the parts in FIG. 20;

FIG. 21 is a schematic illustration similar to FIG. 20 showing the position of the wrapping head and coin lifting mechanism near the end of the coin loading operation;

FIG. 21a is a schematic illustration showing the position of the jaw cam and cam follower corresponding to the position of the parts in FIG. 21;

FIG. 21b is a schematic illustration showing the position of the finger cam and cam follower corresponding to the position of the parts in FIG. 21;

FIG. 21c is a schematic illustration showing the position of the Geneva drive for the wrapping head corresponding to the position of the parts in FIG. 21;

FIG. 22 is a schematic illustration similar to FIG. 20 showing the position of the wrapping head and coin lifting mechanism after a jaw has closed and the wrapping head is ready to move;

FIG. 22a is a schematic illustration showing the position of the jaw cam and cam follower corresponding to the position of the parts in FIG. 22;

FIG. 22b is a schematic illustration showing the position of the finger cam and cam follower corresponding to the position of the parts in FIG. 22;

FIG. 22c is a schematic showing the position of the Geneva drive for the wrapping head corresponding to the position of the parts in FIG. 22;

FIG. 23 is a schematic illustration similar to FIG. 20 showing the position of the wrapping head and coin raising mechanism during rotation of the wrapping head to wrap the plastic film around a row of coins;

FIG. 23a is a schematic illustration showing the position of the jaw cam and cam follower corresponding to the position of the parts in FIG. 23;

FIG. 23b is a schematic illustration showing the position of the finger cam and cam follower corresponding to the position of the parts in FIG. 23;

FIG. 23c is a schematic illustration showing the position of the Geneva drive for the wrapping head corresponding to the position of the parts in FIG. 23;

FIG. 23d is a partial view of a wrapped coin roll positioned within the belt with the end twisted;

FIG. 24 is an enlarged partial view of a conveyor bucket carried by the wire mesh supported by the conveyor chains;

FIG. 25 is an elevational view from the direction of arrow 25 in FIG. 12 showing the coin lifting mechanism in its lower position;

FIG. 26 is an elevational view similar to FIG. 25 of the coin lifting mechanism in its upper position;

FIG. 27 is a sectional view along line 27—27 of FIG. 25;

FIG. 28 is a sectional view along line 28—28 of FIG. 25;

FIG. 29 is an elevational view along line 29—29 of FIG. 15 showing the Geneva drive for the wrapping head;

FIG. 30 is a side elevational view partly in section of the heat sealing portion of the coin wrapping machine;

FIG. 31 is a top plan view of the heat sealing section along line 31—31 of FIG. 30;

FIG. 32 is a transverse sectional view taken along line 32—32 of FIG. 31;

FIG. 33 is a partial enlarged, elevational view of the conveyor chain for the heat sealing section; and FIG. 34 is a transverse section along line 34—34 of FIG. 33.

GENERAL OPERATION

Figure 18:
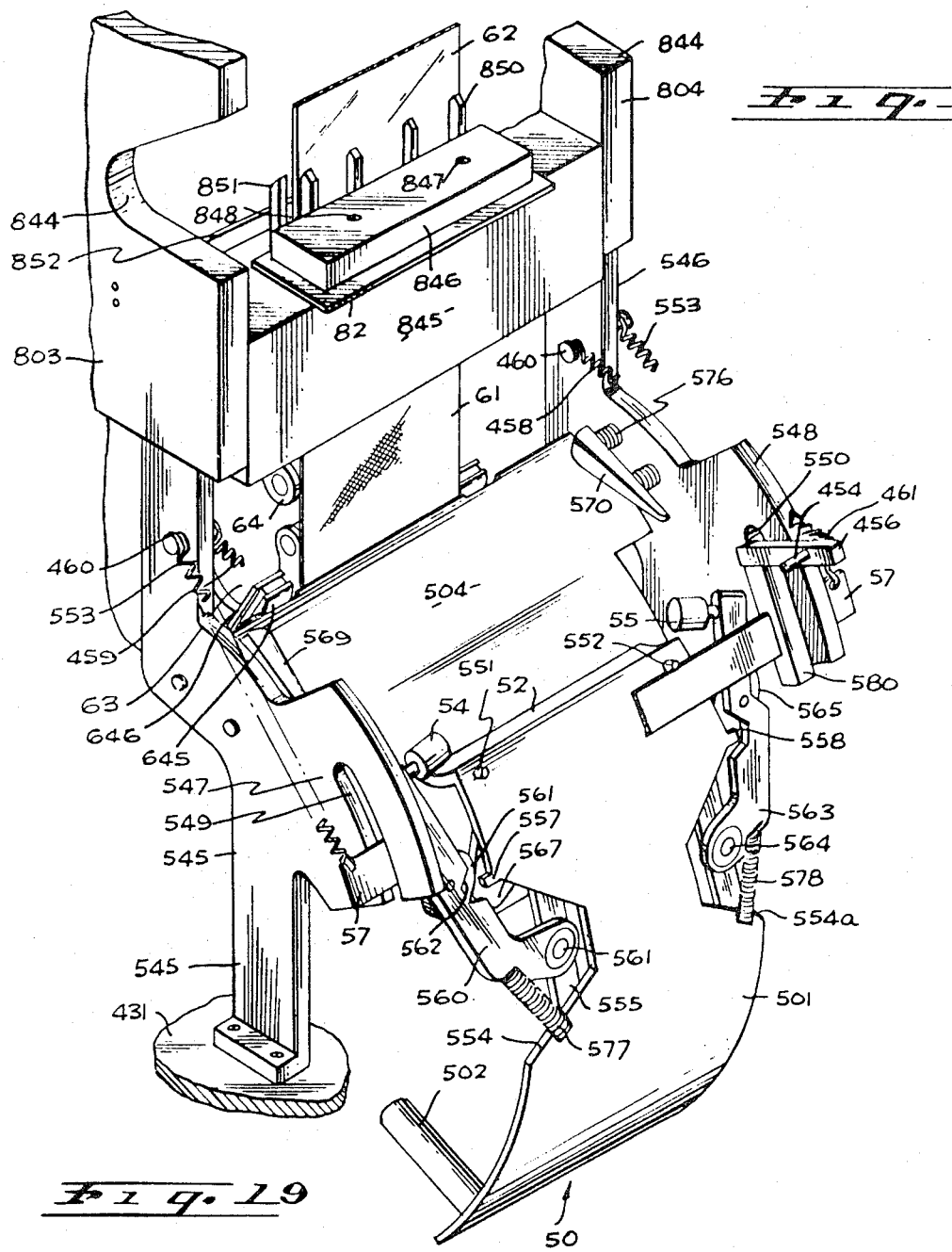
FIG. 18 is a perspective view of the coin raising mechanism for loading rolls of coins into the wrapping head.

Referring to the embodiment of the invention chosen for purposes of illustration, the coin wrapping machine 9 has hopper section 10 having an open top 12 into which the loose coins 19 are fed. The hopper is defined by sides 13 and 14, a slanting bottom 15 and a slanting end wall 16. A vibrator 17 is located on the bottom panel 15 to continually move the coins along with gravity toward the lower corner 18 of the hopper (see FIG. 4). The conveyor for the machine is generally designated as 20 and comprises a pair of space chains 21 and 22 having a flexible wire mesh 23 (see FIG. 5) extending between the chains and coin buckets 24 are spaced along the mesh. The conveyor chains 21 and 22 and wire mesh 23 follow a sharp angle over the chute portion 30 of the machine which comprises two flat plates 31 and 32 with the upper plate 31 having a plurality holes 33 therein to distribute some of the coins to the lower plate 32. The coins move along the plates 31 and 32 onto the coin turning section designated generally as 40 (see FIGS. 4, 7, and 9). The turning section comprises ribbed upper and lower plates 41 and 42 which receive coins from chute plates 31 and 32, respectively, and the coins move along rows 43 and 44 on plates 41 and 42, respectively, as they move downwardly. Each of the rows 43 and 44 terminates in a coin turning portion designated as 45 (see FIGS. 7 and 9) wherein the coins from each row are turned from horizontal into a vertical position and are delivered on edge to track 46 from each row 43 and to track 47 from each row 44. As illustrated in FIGS. 9 and 10, the tracks 46 and 47 are located side by side and proceed downwardly so that the coin will roll under the influence of gravity and vibration. As the tracks proceed downwardly, they converge and connect with tracks 46a and 47a so that all of the track sections 46a and 47a are located side by side at the gathering station 48 (see FIGS. 9 and 11). The coins are covered at the gathering station by a transparent plate 49 (see FIG. 9) which serves to confine the coins within the individual tracks and even out the height of the chains. When the coins come to the raising location, they are formed into a perfect roll as they leave the ends of the tracks 46a and 47a. A cover 51 is spring biased downwardly to hold the upright coins at the end of the tracks 46a and 47a and in position to be moved by the coin raising mechanism designated generally as 50 (see FIGS. 12 and 18). As illustrated in FIGS. 20 and 21, the moving mechanism 50 lifts a roll of coins 56 off the end of the tracks 46a and 47a by means of surface 52 and gripping members 54 and 55 (see FIG. 26) and moves the roll into a cavity 63 in the wrapping head generally designated as 60 (see FIG. 12). A movable bar 57 is placed across the ends of tracks 46a and 47a during movement of the coin rolls in order to hold back the next roll.

The cavity is covered during loading by a continuous canvas belt 61 over which is fed a cut layer of wrapping film 62. The canvas belt is fixed at its ends but can be moved into the cavity by the pressure of the coins. Thereafter, the head 60 is rotated counterclockwise while the canvas is stationary in order to roll the film around the coins (see FIG. 23). As the head 60 receives the roll, a locking bar 64 closes the canvas and film around the coin roll to confine the roll during rotation (see FIG. 22). As the head 60 reaches the position shown in FIG. 20, the left cavity 63a is unloaded by the action of the belt 61, onto a conveyor 67 before loading of the right cavity 63 commences. Thus, the action of the coin lifting mechanism 50 is to engage a roll of coins from the end of the tracks 46a and 47a and move the roll 56 into a cavity 63 in the wrapping head 60. The roll of coins is moved against a cut layer of film which covers a canvas belt and the rotation of the wrapping head 60 relative to the canvas causes the layer of film to be wrapped around the roll of coin. At the same time, the fingers 65 grip the ends of the film while it is being rotated in order to twist the ends and thereby form a closed film envelope for the roll of coins. Since the head 60 contains two cavities 63 and 63a, two rolls are produced for each complete rotation of the head.

The completed film covered roll is discharged from the head 60 and moves over conveyor 67 to the sealing section 70 (see FIG. 30). Each roll is deposited on a chain conveyor 71 in a space 73 between spaced blocks 72 which are secured to the chain. The rolls are forced downwardly by a spring biased cover 74 (see FIG. 32) while the rolls move between two hot plates 75 which compress and seal the twisted ends of the plastic film. At the ends of the plates 75, the roll of coins falls off the conveyor chain 71 onto a chute 76 and the coins roll downwardly into a discharged passage 77 which may lead to any standard type of roll packaging equipment. When the roll of coin leaves the machine, it is wrapped by a layer of film, the ends of which have been compressed and heat sealed to tightly enclose the roll as illustrated by FIG. 1. A film feeding mechanism 80 comprises a supply roll 81 of film which is guided by a plurality of rollers into a location between a fixed knife 82 and a rotating knife 83 (see FIG. 12) and each rotation of the blade 83 severs the film layer 62 into a length suitable for wrapping a roll of coin. Each piece of film is cut after the film is confined against the canvas by the coin roll moving into the head cavity 63.

From the above general description, it is apparent that coins can be dumped into the hopper 10 and raised by the conveyor 20 onto the chute portion 30 and the chute portion directs the coins onto the coin turning section 40 where the coins are turned on edge and delivered to the tracks 46 and 47. The coins 19 proceed by gravity and vibration to the gathering station where they are formed in tightly compressed coin rows 56. Thereafter, the coin lifting mechanism 50 raises the roll of the coins from the end of the tracks 46a and 47a and into cavity of the wrapping head 60. The rotation of the wrapping head 60 in cooperation with the stationary canvas belt 61 causes the section of film 62 to to be wrapped around the roll of coin. At the same time, during the wrapping process, the ends of the film are gripped to cause them to be twisted to tightly hold the coins. The coins are then discharged to an end sealing section 70 where the twisted ends are compresses and heat sealed in order to form a finished wrapped coin roll 56. The details of construction of the machine will now be described in connection with the general sections of the machine which have been designated above and the parts for each section will be designated by numerals which are in the hundreds and commence with the same number as the general section.

HOPPER 10

The end wall 16 of the hopper 10 connects with a lower panel 102 having tapered end 101 which directs the coins 19 to the bottom slot 102a in panel 102. The coins pass from the compartment 12 into compartment 103 between side members 104 and 105 which further narrow down the passage for the coins. The conveyor chains 21, 22 and buckets 24 are covered by a plate 107, and slot 106 is located between bottom panel 18 and the lower end of panel 107. The width of slot 102a can be varied by the position of a panel 108 which contains slots 109 receiving bolts 110 passing through the panel 102. The amount of coins moved to the conveyor buckets 24 by gravity and vibrator 17 can therefore be controlled by adjusting the width of slot 102a. A rod 111 extends between the side members 104 and 105 and pivotally mount a plurality of fingers 112 under which the coins must pass. The fingers serve to smooth out and separate the coins into a single layer.

CONVEYOR 20

The two endless chains 21 and 22 of section 20 each pass over a sprocket wheel 201 at the lower part of the machine and over sprocket wheels 202, 203, and 204 at the top of the machine so that each chain has the same shape illustrated in FIGS. 4 and 6. The continuous, flexible metal mesh 23 extends between the chains 21 and 22 and is supported by a plurality of narrow bands 208 extending between the chains at spaced intervals. Each bucket is secured to a band 208 by a plurality of bolts 209 spaced along the bands (see FIG. 24) and connected at their ends to corresponding link of the opposite chains 21 and 22. An upright member is located at each side of the machine frame and has one side 211 attached to the frame by bolts 211a. The other side 210 of each upright member carried a chain guide 210a (see FIG. 5) which guides the chains 21 and 22 in the upward direction. Opposite ends of the buckets are covered by sides 212 of angle irons which are supported by angle member 213 connected to plate 107 so that the member 212 on opposite ends of the buckets extend vertically along the buckets to retain the coin in the buckets along with cover plate 107. The other sides 214 of the angle irons serve as top covers for the chains 21 and 22 opposite the guides 211. An angle member 215 extends between the sides 211 and supports idle gears 216 which take up the slack in the chains 21 and 22 as they move downwardly. A bottom cross piece 217 extends between the end legs 218 of the frame and serves as a support for motor 219 which has an output pulley wheel 220 driving a belt 221 (see FIG. 4). The shaft 222 for the sprocket wheels 201 extends between the lower end of sides 211 and are supported for rotation by pillow blocks 223 mounted on sides 210. A pulley wheel 224 on the shaft 222 serves as a drive for the chain sprockets 201 which are located on opposite sides of the hopper for driving chains 21 and 22. The sides 212 extend above the open top of the hopper along with cover plate 107 to form a continuous cover for the coins in the buckets 24 which are backed by the flexible wire mesh 23.

A support 227 extends outwardly from each of the sides 211 and each support carries one of the sprockets 202 (see FIG. 4). Also, the end of each support carries a pillow block 228 for the shaft 229 of each sprocket wheel 203. Each of the sprocket wheels 204 is supported by a pillow block 234 located in a groove in the adjacent side 211. A cover plate 235 can be attached to each of the sides 211 in order to cover the sprocket 203 and 204 on each side of the machine.

In operation of the conveying portion 20, the coins are fed to the buckets 24 through the slot 106 by means of the vibrator 17 and the force of gravity and the buckets are loaded along their length, the coins being retained in the buckets by the back metal mesh as the buckets are moved upwardly by chains 21 and 22 at an angle to the vertical. When the buckets reach the sprocket 202, they move outwardly in the direction of the support 227 which causes the coins in the bucket to be discharged onto the chute portion 30 of the machine. The metal mesh 23 behind the buckets insures that all of the coins will fall forward onto the chute portion as the buckets move outwardly over the chute portion. The chains then move around the sprocket wheels 203 so that the buckets reverse direction and travel back around pinions 204 and down to the pinion 201 where the buckets are again moved upwardly to receive another load of coin. Thus, a continuous supply of coins will be deposited on the chute portion 30 and any detrimental spillage of the coins is prevented by the mesh backing of the buckets and the top and side covers for the conveyor.

CHUTE SECTION 30

The top plate 31 of the chute portion 30 receives the coins as they are dropped from the buckets 24 and holes 33 in the top plate 31 distributes the coins between plates 31 and 32 as the coin slides downwardly on the plate 31 under the force of gravity and vibration. A random portion of the coins will drop through the holes 33 onto the lower solid plate 32. However, the total coins conveyed by the buckets 24 will be about evenly distributed between the plates 31 and 32. A shaft 301 extends between uprights 302 (see FIG. 4) on opposite sides of plate 30 and the shaft carries a plurality of side by side movable fingers 303 which serve to smooth out the coins passing over the plate 31 into a single layer. In a similar manner, a shaft 304 extending between the upright 305 on opposite sides of plate 32 and the shaft carry a plurality of fingers 306 which serve to smooth out the coins on the plate 32 into a single layer. The plates 31 and 32 are connected with the coin turning section 40 by means of the brackets 307 and 308, respectively. Each of the plates 31 and 32 have sides 310 and 311 (see FIG. 9) which serve to retain the coins on the plates as they move downwardly under the force of gravity and vibration. The upper end of the bottom plate 32 is received in notches 312 in the side members 212 in order to place the end of the lower plate 32 in a position to catch any coins which may fall past the end of the upper plate 31 as they leave the buckets 24.

COIN TURNING SECTION

The spaced plates 41 and 42 of the coin turning section 40 are overlapped by the lower end of plates 31 and 32, respectively, so that the coins will move from the chute portion 30 onto the plates 41 and 42. Each of the plates have a plurality of ribs 401 which divides the plate 41 into rows 43 and the plate 42 into the rows 44. The rows in each of the plates are wide enough to receive the coins 19 and divide the coins into rows as they move downwardly along each of the plates. The plates 41 and 42 are held in spaced relationship by a bracket 402 on each side thereof which is connected to the side of the plate 41 by bolts 403 and to the side of the plate 42 by the bolts 404 (see FIG. 7). A shaft 405 projects from each bracket 402 and receives the end of an extendable rod 406 which extends from a support cylinder 407. The opposite ends of cylinders 407 are secured to the flanges 408 on the sides 13 and 14 of the machine so that the height of the plates 41 and 42 can be adjusted by the extension of the shafts 406 on each side of the machine.

As the coins move downwardly in the rows 43 and 44 past the brackets 402, they enter the turning section 45 (see FIG. 8) provided for each of the plates. Each turning section 45 consists of an upright back plate 410 which drops downwardly from a portion of the end of each row 43, 44 and the remaining portion 411 of each end continues outwardly to terminate in an angular edge 411a The rib 401 on one side of each row slants downwardly and inwardly to form wall 412 connecting with one side 413 of a track 46 connecting with a row 43 or one side 413 of a track 47 connecting with a row 44. The other side 414 of a track 46 or 47 connects with portion 411. Referring to FIG. 8, a coin 19 moving down a row 43 or 44 is forced past the back plate 410 so less than one-half of the coin moves onto portion 411. Thus, the unsupported portion of the coin will tip downwardly so that its coin edge 19a strikes wall 412 and the slant of the wall causes the edge of the coin to move downwardly into a track 46 or 47 so that one coin after another is placed on edge in tracks 46 and 47. The coins assume a substantially vertical position in the tracks and continue to move downwardly in edgewise relationship. As illustrated in FIG. 4, the turning portion 45 of each of the plates 41 and 42 is located over the open top of the hopper section 10 so that any coins falling off a turning section will drop back into the hopper and will not interfere with the operation of the machine. The number of rows leading to the turning portions 45 are somewhat reduced by the tapered walls 416 directed inwardly from the sides of the plates 41 and 42.

The coins 19 in tracks 46 move downwardly in the angular track sections 419 (see FIG. 10) until the tracks 46 are adjacent to the tracks 47 leading from the turning section 45 for the lower plate 42. The angular portions 419 of the tracks 46 have upright flanges 420 containing a curled edge 421 which covers the top edge of the coins and keeps the coins from leaving tracks 46 as they make the angular turn downward toward the tracks 47. As the tracks move downwardly in pairs towards the gathering station 48, they move closer together so that all the tracks become adjacent one another. At point 423, the tracks 46 and 47 terminate and continue as tracks 46a and 47a which have a single divider 418 between them and the dividers are separated by spacers 442.

The lower ends of the tracks 46 and 47 are supported by shaft 425 connected to rods 424 which are adjustably contained in cylinders 426 carried by the flanges 408 on opposite sides of the machine (see FIG. 4). The tracks 46a and 47a are supported at their super ends by a shaft 429 connected to rods 428 each of which is adjustably contained in a cylinder 430 supported by a top plate 431 which overlaps the end flange 432 of the hopper section 10. The lower end of tracks 46a and 47a are supported by a shaft 436 connected to rods 435 each of which is adjustably contained in cylinders 437 attached to the plate 431. Since these rods are all adjustable, the section 40 can be adjusted in height and angular position to assume proper feeding of the coins. A vibrator 441 is attached below the tracks 46 and 47 and a vibrator 440 is located below the tracks 46a and 47a to aid in moving the coins. The major portion of tracks 46a and 47a are covered by the transparent cover plate 49 (see FIG. 11) which is hinged to a bracket 440' by a pin 441 and the weight of the cover plate 49 will maintain the coins in compact condition within the adjacent tracks 46a and 47a. The spacers 442 are located between the tracks and shafts 429 and 436 extend through the dividers 418 and the spacers 442 in order to support the tracks 46a and 47a (see FIG. 11). The cover plate 49 rests on side 444 which has a height to provide a space 445 which is less than the width of a coin so that any coins leaving the tracks cannot enter the space 445 in flat condition.

It is therefore apparent that the coin turning section 40 receives the flat coins from the chute section 30 and places them vertically on edge at the turning sections 45 and thereafter delivers the coins on edge to the loading station 48 in the form of a compact roll of coins and the number of coins in tracks 46a and 47a correspond to the number of coins in a commercial roll of the particular coin. In other words, if the coins 19 are 5¢ pieces, there will be 40 coins located side by side at the location 48 and separated by dividers 418. The downwardly spring biased coin cover 51 is hinged to a plate 450 at location 48 (see FIG. 9). Arms 454 and 455 extend from cover 51 at the hinge line and carry cam followers 456 and 457, respectively, which are engaged to move the cover upwardly at the start of the loading of the wrapping head 60. Springs 458 and 459 are connected by pins 460 with the frame and by screws 461 with follows 456 and 457, respectively, to continually bias the cover 51 downwardly (see FIG. 18).

COIN LIFTING MECHANISM

The coin lifting surface 52 is located at the top of a curved plate 501 which is rigidly secured to two arms 502 for movement in an arc about shaft 503 (see FIG. 12). As illustrated in FIG. 20, when a roll 56 of coins is in a position to be engaged by the coin surface 52, the cover 51 is bearing downwardly on the individual coins and the coins remain partially in the ends of tracks 46a and 47a. A stationary arc plate 504 is located ahead of the coins at the loading station and the latch arm 57 is held below the coins. Referring to FIGS. 12 and 15, the end of shaft 503 carries a crank 505 which is pivotally connected to intermediate link 506 which in turn is connected to one end of arm 507. A shaft 508 connects with the other end of arm 507 and is mounted in a pillow block 509 supported by a cross frame member 510 which extends lengthwise of the machine between the legs 511 and 512 (see FIG. 2). A similar cross member 513 extends between the legs and serves to mount the motor 514. Top cross members 515 serve to support the top plate 431 and the cross pieces are duplicated on the opposite side of the frame. The pair of legs 511 and the pair of legs 512 are connected together by transverse cross pieces 520 and each side of the frame section can be covered by a plate 521 to enclose the mechanism defined by the legs 511 and 512.

The motor 514 is connected with the pulley 525 on a shaft 526 by means of belt 527 and shaft 526 is rotatably supported on pillow blocks 528 and 529 mounted on cross pieces 510. Connected to pulley wheel 525 is a cam 530 which contains a side cam track 531 and a roller 532 connected to lever 507 rides in the cam track 531 which is substantially elliptical (see FIG. 12). A spring 533 connects between frame member 510 and the lever arm 507 in order to continually urge the arm 507 in a direction to force the roller 532 against the inside of the cam surface. Cam track 531 is shaped to oscillate the lever 507 back and forth about the shaft 508 and thereby oscillate the arms 502 about the shaft 503 with a dwell period at the top and bottom. A pair of spaced blocks 540 and 541 are supported on the top cover plate 431 and the shaft 503 is journaled in these blocks by bearings 542 and 543.

The stationary plate 504 is supported by a pair of upright members 545 and 546 (see FIGS. 12 and 18) which have extensions 547 and 548, respectively, containing grooves 549 and 550, respectively, through which the ends of the latch arm 57 can move. Also, the movable plate 501 has a pair of pins 551 and 552 which engage latch arm 57 and move it downwardly to the down position shown in FIG. 18 when the plate 501 is in its down position. This downward movement of latch arm 57 is against the force of springs 553 which connect the frame with the ends of the latch arm. When the cam 531 moves the plate 501 upwardly to move a roll 56 of coin upwardly, the pins 551 and 552 release the latch arm 57 so that it moves upwardly to block the coins in the tracks 46a and 47a (see FIG. 21). The blocking position of latch arm 57 continues until the member 501 again returns to its down position as illustrated in FIG. 23.

The movable plate 501 has cutouts 554 and 554a across which project members 555 and 556, respectively (see FIGS. 18, 25, and 26). Also, the plate 501 carries projections 557 and 558 at positions opposite one another at the top of the cutouts 554 and 554a, respectively. A holding arm 560 is pivotally connected by pin 561' to the member 555 and the end of the arm 560 carries the gripping member 54. Also, the arm 560 carries the cam roller 561 and has notch 562 for receiving the projection 557. In a similar manner, a holding arm 563 is pivotally connected to the member 556 by pin 564 and the other end of the arm carries the coin gripping element 55. A cam roller 565 is carried intermediate the arm adjacent to a notch 566 which receives the projection 558. Stationary plate 504 carries a pair of cams 567 and 568 at the lower corners thereof and also the vertical sides of frames 545 and 546 carry spring biased cam members 569 and 570 which are located in the path of movement of the arms 560 and 563; the cams 569 and 570 being biased outwardly from the side frames 545 and 546 by the springs of 575 and 576, respectively. In addition, compression springs 577 and 578 are connected between plate 501 and the arms 560 and 563 and continually operate against the arms to bias the gripping members 54 and 55 inwardly toward the end coins in a row of coins assembled at the gripping location.

When the plate 501 is in its down position as illustrated in FIG. 25, the rollers 561 and 565 engage the cams 567 and 568, respectively, to move the arms 560 and 563 outwardly and away from the ends of the rows of coin. At the same time, the latch arm 57 is below the roll of coins at the loading station so that the coins are opposite the bottom plate 504. Rotation of the cam 531 moves the plate 501 upwardly so that the roll of coins is lifted by a lifting surface 52 toward the wrapping head 60. Upon the initial movement, the gripping members 54 and 55 are permitted by cams 567 and 568 to move inwardly under the action of springs 577 and 578 in order to grip the end coins in the row of coins, thereby holding the roll of loose coins on the surface 52 as the roll is moved upwardly into the position shown in FIG. 26 and against the wrapping film 62.

During the upward movement, the rollers 561 and 565 on arms 560 and 563 engage the cams 569 and 570 and bias the gripping elements 54 and 55 tightly against the ends of the coin roll until the grooves 562 and 566 in the arms engage the pins 557 and 558, respectively (see FIG. 26). The roll 56 of coins is now ready for gripping by the wrapping head and removable from the surface 52 of the movable plate 501. After the coins are gripped by the head, the movable plate 501 is moved downwardly by the cam 531 into the position shown in FIGS. 18 and 25. The latch arm 57 has again been moved downwardly by pins 551 and 552 to permit the next row of coins to move onto the surface 52 ready for the next loading cycle. As the plate 501 moves to the down position, the cams 567 and 568 engage the rollers 561 and 565 and move the gripping elements 54 and 55 away from the ends of surface 52 so that the next row of coins can be received thereon. It is therefore apparent that upon one revolution of the cam 531, the plate 501 will move upwardly from the position of FIG. 25 into the upward position of FIG. 26 and then return to the down position of FIG. 25 and one revolution of the shaft 526 will result in the loading of a roll 56 of coin. The position of maximum travel of the coin roll into the wrapping head 60 is indicated by the dotted line 56' in FIG. 21 and the surface 52 will dwell at this position and at the bottom position while receiving a new row of coins.

In the position of the cover 51 in FIG. 20, it is being held downwardly by the force of the springs 458 and 459 which connect between the cam followers 456 and 457 and pins 460 on the frame portions 545 and 546. The latch arm 57 has a cam 580 on each end thereof which moves with the latch 57 under the force of springs 553 and engage the cam followers 456 and 457 in order to raise the cover 51 upon the initial upward movement of the plate 501. The cams 580 continually engage the followers 456 and 457 to hold the cover 51 in the up position during the time a roll of coins is being moved into the wrapping head and during the time the plate 501 is returning to the down position. When the latch arm 57 returns to its down position, the cover 51 again engages the top of the roll of coins in order to hold the coins in the tracks awaiting the next upward movement of the surface 52.

THE WRAPPING HEAD

The wrapping head 60 consists of two spaced plates 601 and 602 which are connected together with a plurality of rods 603 spaced around the circumference of the plate and carrying rollers 603a (see FIG. 15). Each side plate contains two cutaway cavities 63 and 63a which are opposite one another and each cavity is located between two of the rods 603. The two cavities in plate 601 are aligned opposite to the cavities in plate 602. Blocking jaws or arms 64 and 64a extend between the two plates 601 and 602 adjacent cavities 63 and 63a, respectively, and each jaw is supported by means of pivot pins 604 which are connected with opposite plates 601 and 602 for pivotally mounting of the arms 64 and 64a. The pin 604 extends through the plate 601 and each pin is connected to an arm 605 externally of the plate 601. Each arm 605 carries a roller 606 riding in cam track 507 located in the cam plate 608 (see FIGS. 15 and 17). As illustrated in FIG. 16, the cam plate 608 has a plate 609 attached to the back thereof and connected by pin 610 to a linkage arm 611 which in turn connects with one end of a bell crank 612 pivotally mounted on a pin 613. The opposite end of the bell crank supports a follower 617 which rides in a cam track 618 in the cam plate 619 which is mounted for rotation on the drive shaft 526. The cam track 618 has an open section 618a which holds cam plate 608 in the jaw closed position and a section 618b which holds cam plate 608 in the jaw open position. The pivot shaft 613 is supported by pillow blocks 614 and 615 carried by top plate 431.

The drive shaft 526 also drives a Geneva mechanism by a pinion 617 in mesh with the driver gear 618 which has twice as many teeth as gear 617. The shaft 619 for gear 618 connects with driver 620 which has drive pin 621 and 622 spaced 180° apart (see FIG. 29). The pins alternately move into one of the four slots 623–626 of the driven member 627 mounted on driver gear 628 and the gear 628 meshes with gear 629 on the end of a shaft 630. The gear 628 has twice the teeth of gear 629 so that shaft 630 makes one-half the revolutions of shaft 526. Also, the rotation of shaft 630 is intermittent since each pin 621, 622 moves the shaft 630 a quarter revolution, followed by a dwell before the other pin moves the shaft another quarter revolution. The shaft 630 extends through and connects with plates 601 and 602 and is supported by pillow blocks 631 and 631a mounted on block 540 and 541, respectively. The cam plate 608 and back plate 609 are freely rotatable on the shaft 630 so that cam plate 608 can be moved by cam 619 independently of shaft 630.

In FIG. 17, the arm 64a is shown in a position corresponding to that of FIG. 20 wherein it is open to let a roll 56 of coins move onto a conveyor 67 and as illustrated in FIG. 20, the opposite arm 64 is open to receive a roll of coin upon movement of the loading mechanism 50. When the cam 531 moves the plate 501 upwardly in FIG. 20, the roll of coins 56 is moved towards the cavity 63 in the side plates 601 and 602. At the same time, the film 62 is being fed over the front of the cavity 63 and past the edge of the stationary plate 504 so that when the roll of coins 56 reaches the mouth of the cavity 63, a cut piece of film is over the cavity and is engaged by the coin 56. As the coin roll starts to move toward the position illustrated in the FIG. 21, the gripping elements 54 and 55 grip the coins and hold them on the lifting surface 52 while the cam 531 moves the coins fully into the cavity 63. During this time, the arm 64 is stationary since the head 60 carrying roller 606 is stationary and cam 619 provides a dwell section for cam 608. Thereafter, the cam lever 612 moves cam 608 to cause arm 64 to move downwardly into the position of FIG. 22. During this motion, the arm 64 moves canvas belt 61 and film piece 62 around the coin roll and tightly holds the coins after the gripping elements 54 and 55 are removed upon return of surface 52 to the down position.

The canvas belt 61 passes over feed rollers 640 and 641 and ends 632 and 633 of the canvas are restrained by cams 634 and 635, respectively, when closed. The canvas belt also passes over guides 636 and 637 which are biased downwardly to spring load the canvas 61 about the rollers 603a of the head 60. As illustrated in FIG. 12, the cams 634 and 635 are rotated to pinch the ends of the canvas belt against the central support plate 638 when it is desired to lock the ends of the canvas belt. As illustrated in FIG. 20, before the loading of a roll of coins, the canvas belt covers the cavity 63 and the wrapping film 62 covers the canvas. Thus, when the row of coins is moved into the position of FIG. 21, it pushes the film against the canvas and the surface 52 causes the coin, the film, and the canvas to move into the cavity 63. At this time, the cam 608 is moved by cam 619 (see FIG. 16) causing the arm 64 to move around the coin roll thereby confining the coin roll in the cavity 63 and placing the canvas belt and film tightly around the roll as illustrated in FIG. 22. Referring to FIG. 20, the wrapped roll 56 is discharged from cavity 63a before a new roll is inserted into cavity 63. Therefore, the belt need expand only enough to fill one cavity at a time.

The film 62 is wide enough that the ends of the film extend past the side plates 601 and 602 of the head 60 while the sheet is being wrapped around the coin. The wrapping fingers 65 comprise first and second pair of arms 645 and 646 which are located adjacent cavity 63 with one pair on each of the plates 601 and 602 and the ends of the arms are pivoted to the plates by the pins 647 and 648, respectively. The opposite end of each pair of arms has gripper elements 649 and 650 which are located to close upon the ends of the wrapping paper sticking beyond the plates 601 and 602 in order to hold the ends stationary as the canvas wraps the film layer around the coin roll. The opening and closing of each pair of twisting arms is controlled by cam plate 651 which contains a cam track 652 (see FIGS. 15 and 19) and the cam plate is supported on shaft 630. A roller 653 rides in the track 652 and is connected by an arm 654 to the arm 645 at pin 648. A lever arm 655 is connected with a back plate 656 on cam 651 (see FIG. 15) and the end of the lever is secured to the block 540 by means of a bolt 657 in order to hold the cam 651 stationary during the rotation of the shaft 630. The two piars of arms 645 and 646 move with the plates 601 and 602 and move the rollers 653 through the cam track 652.

Figure 19:
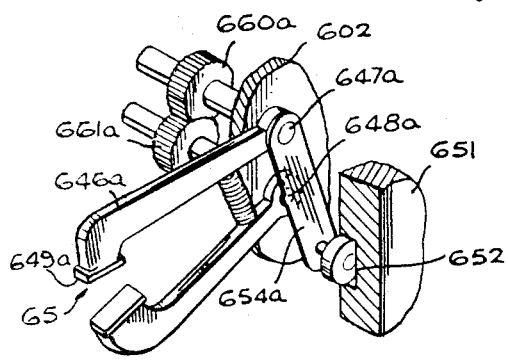
FIG. 19 is a perspective view in the direction of arrow 19 of FIG. 15 showing the cam for moving the twisting fingers of the wrapping head.

In a similar manner, third and fourth pairs of arms 645a and 646a are located adjacent cavity 63a in the plates 601 and 602 and the ends of the arms are pivoted to the plates by pins 647a and 648a (see FIG. 19). The arms have gripping elements 649a and 650a for closing upon the film extending from cavity 63a and the opening and closing of each pair of arms is controlled by the same cam plate 651 containing the cam track 652. The roller 653a rides in track 652 and connects with arm 654a having its opposite end connected with the pivoted end of arm 646a. The mechanism for moving the other arm of each pair is shown in FIG. 19 for a pair of arms 645a and 646a. The movement of pin 647a rotates gear 660a which meshes with gear 661a on pin 648a. The movement of the arm 646a by the link 654a causes the pin 647a to rotate thereby driving the gear 660a which is in mesh with the gear 661a on the pin 648a. The pins 647a and 648a and pins 647 and 648 extend across the head 60 and drive the opposite pair of arms so that the two pairs of twisting arms located on opposite sides of each cavity 63, 63a move together to grip and release the ends of the film around the coins.

The operation of the moving plate 501 for loading a cavity 63 with a roll of coins has been previously described in connection with the coin raising mechanism 50. The operation of the machine to roll the film around a coin row in the wrapping head 60 will now be described. Referring to FIG. 20, the wrapping head 60 is shown in a dwell position with cavity 63 ready to receive a roll of coin and the wrapped roll having been released from cavity 63a by opening of jaw 64a. The drive mechanism shown in FIG. 20c is in dwell condition and the drive 620 is rotating clockwise toward slot 623. The cam track 607 of FIG. 20a is located in its down position by the rod 611 under the control of the cam track 618 which is continuously revolving. The cam track 618 is in the position shown in FIG. 16 in which the smaller cam radius 618a locates the roller 617 and holds cam track 607 in the down position. Referring to FIG. 16, the portion 618a of cam track 618 maintains the cam track 607 in the down position and portion 618b maintains cam track 60 in its up position. As illustrated in FIG. 20a, the cam rollers 606 and 606a are located about equal distance from the center of the cam track 607 and position the arms 605 and 605a to hold the jaws 64 and 64a open. At the same time, the finger cam track 652 (see FIG. 20b) which is fixed to the frame, has the rollers 653 and 653a located approximately equal distances from the center of the cam in position to hold the fingers 645, 646 and 645a, 646a apart. Thus, in the position of FIG. 20, the wrapping head 60 is stationary with the jaws 64, 64a and twisting fingers open.

Referring to FIG. 21, the movable plate 501 is moving the coin roll 56 into cavity 63 and during this time the Geneva driven member 627 remains stationary so that the head 60 is stationary. As indicated in FIG. 21c, the driver 620 for the Geneva mechanism (which rotates at one-half the speed of shaft 526) has continued to rotate and is about to enter slot 623. Also, as illustrated in FIG. 21a, the jaw cam track 607 is still in the down position since roller 617 of cam 619 is still engaged by cam track portion 618a which is rotating and both jaws remain open. Since the head of 60 is still stationary, there is no change of the open position of the twisting fingers as indicated by FIG. 21b. However, in FIG. 21, the belt tensioners 636 and 637 for the belt 61 have moved up since the movement of the coin roll into the cavity 63 increases the amount of belt around the head 60 and through the cavity.

Referring now to FIG. 22a, the cam track 607 has been moved to the up position by the link 611 since roller 617 has encountered the cam track portion 618b. The upward movement of the cam 608 causes the rollers 606 and 606b to assume positions on the cam track 607 in which jaw 64a remains open and jaw 64 closes around the roll of coins. When a roller 606, 606a is in the cam portion 607a, the connected jaw is closed and when a roller is on the cam portion 607b, the associated jaw is open. The movement of cam track 607 to its up position occurs just before the Geneva mechanism starts to drive the head 60 as illustrated in FIG. 22c and at this time, the arms 654 and 654a for driving the fingers have still not moved since there has been no movement of the wrapping head (see FIG. 22b). In other words, in FIG. 22, the jaw 64 has been closed while the jaw 64a remains open, the head 60 commences to move and the twisting fingers are ready to be closed.

Referring now to FIG. 23, the head 60 has moved approximately 90° by movement of pin 621 in slot 623 to move the driven member 627 about 45° as illustrated in FIG. 23c. The rotation of head 60 causes arm 654 to move and close the fingers 645 and 646 against the ends of the film in order to twist the film ends on opposite sides of the head 60. The roller 653 has entered the finger closed portion 652a of the cam track 652 while the roller 653a is still on the finger open cam portion 652b so that fingers 645a and 646a are still open. The portion of the cam track 652 executes the opening and closing movement of the fingers. It is understood that during the remaining rotation that the cavity 63 from the position of FIG. 23 into the unload position corresponding to that shown for cavity 63a in FIG. 20, that the roller 653 will follow along the closed track portion 652a until it again reaches the position shown for the roller 653a in FIG. 20 at which point the jaw will again open and allow the discharge of the wrapped roll before the new roll is loaded. As the head commences to move toward the position of FIG. 23, the portion 618b moves the link 611 and cam track 607 downwardly into its lower position shown in FIG. 23a. As the cam track 607 moves downward, the head 60 commences to move and the roller 606 stays in the closed track portion 607a while the track moves downwardly thereby maintaining the jaw 64 closed. Once the cam track 607 reaches its down position, further movement of the roller 606 in the cam track starts the jaw 64 to open so that when it reaches the open track position 607b, the cavity 63 has reached the roll discharge position shown in FIG. 20 for cavity 63a.

Referring again to FIG. 22, once the jaw 64 captures the roll of coins, the belt and film are substantially around the roll. Upon movement of the head 60 relative to the belt, which remains fixed, the canvas will cause the coins to roll counterclockwise curling the film tightly around the coins. At this time, the twisting fingers have closed on both ends of the film and will hold the film ends as the belt continues to roll the coins, thereby twisting the ends and taking up any slack within the roll. At the end of the rolling operation, the fingers first release the film ends and the holding jaw then opens to release the roll.

HEAT SEALING SECTION

The wrapped rolls 56a are discharged rfom the wrapping head into the spaces 73 between the blocks 72 carried on the endless chain 71 (see FIGS. 30 and 33). The chain moves around the end sprocket wheels 701 and 702 which are supported on shafts 703 and 704, respectively, having their ends mounted in pillow blocks 705 located on top frame members 706. An idle roller 707 for chain 71 is carried by shaft 707a supported by the frame members 706. The chain is driven by sprocket 701a mounted on shaft 703 and connected by belt 708 with motor 708a which is mounted on the lower frame bed 709 supported by legs 710 of the frame. The rolls of coin 56a move under the lid 74 which extends along the frame and the lid is supported at each end by two rods 711 and 712 passing loosely through openings in frame section 713 and 714. The rods 711 and 712 are surrounded by compression springs 715 and 716, respectively, and have enlarged ends 715a and 716a, respectively, to limit the downward position of the lid 74 under the force of the springs. As the rolls 56a move under the lid 74, they are held firmly in position between adjacent blocks 72 by the lid 74 and the twisted ends of each roll engage the heat sealing plates 75 on opposite sides of the blocks. Each heat sealing plate is supported at its end by a pair of rods 720 and 721 which extend loosely through the sides of frames 713 and 714. The rods 720 and 721 are surrounded by compression springs 722 and 723 to bias the plates 75 toward the ends of the coin rolls and the inward movement is limited by enlarged ends 724 on the rods.

An insulating plate 725 extends between the pairs of rods 720 and 721 behind each plate 75 and a pair of posts 726 supports each insulating plate 725 in order to prevent excessive loss of heat from the heating plates 75. The ends of the plates 75 adjacent conveyor 67 flare outwardly somewhat to guide the rolls between plates 75. Also, a cover 727 is placed around the plate 75 to reduce heat loss and it is understood that the plates 75 are equipped with any well known type of electric heater (not shown) connected to a suitable electrical source. Referring to FIG. 34, the blocks 72 are held to chain by angle irons 730 and 731 which connect to opposite links of the chain 71 and the bottom of the blocks 72.

As the rolls move along the sealing plates 75, the twisted ends of the film are pressed and heat sealed in order to provide a compact roll as the roll leaves the end of the sealing plates. As a roll rounds sprocket 701, it falls from a space 73 between the blocks and onto the conveyor 76 which causes it to roll on downward to the chute 77. The rolls leaving the chute 77 are ready for packaging in any desired manner. The final roll is a tightly held compact roll of coins which can be packaged in minimum space and is easy to handle.

PAPER FEED

The paper feed mechanism 80 consists of upright frame members 801 and 802 (see FIGS. 12 and 15) which are located adjacent blocks 540 and 541 and which, together with frame members 545 and 546, support top side frames 803 and 804. A pair of arms 805 and 806 project from the top of the side frames 803 and 804, respectively, and have a cross piece 801 for supporting the roll of plastic film 81. The film feeds from the roll 81 under a first roller 809 and over a second roller 810, both of which extend between the sides 803 and 804. The film then passes between the drive rollers 811 and 812 and then pass the stationary knife 82 and rotating cutting knife 83 (see FIG. 12). The drive for the elements of the feeding mechanisms is provided by the sprocket wheel 820 which is fixed to shaft 526 nd driven by the motor 515. An endless drive chain 821 passes over idler wheels 822 and 823 which are located over an opening 824 in the base plate 431 and are supported by side plates 825 and 826 (see FIG. 9). The chain thereafter passes upwardly around the sprocket wheel 826 which is located at the end of a shaft 827 for roller 828 which carries the cutting knife 83. A gear 830 is driven by the shaft 827 and meshes with an idle 831 which is supported on plate 803 by means of an arm 832 which has an adjustment opening 833 receiving a locking bolt 834. The roller 811 has an end gear 835 in mesh with the idle gear 831 and gear 835 drives the roller 811 which moves the film. The roller 811 is supported for rotation at opposite ends by the plates 803 and 804 and the gear 835 drives a gear 836 on rubber roller 812 (see FIG. 14).

The roller 812 is mounted on a pair of arms 840 which are pivoted to sides 803 and 804 by pins 841. The edges 842 of the arms 840 are moved into adjacent relationship with the ends of the sides 803 and 804 in order to develop pressure between the rollers 811 and 812. A pivotal lock 843 is mounted on the ends of frame sides 803 and 804 and each lock has a cam surface which cams the arms 840 toward roller 811. Each lock contains a spring which forces the cam surfaces against the arms 840 to spring bias the rollers 811 and 812 together. The plates 803 and 804 contain cutouts 844 (see FIG. 18) to permit the ends of the roller 812 to swing inwardly against roller 811 and the gears 835 and 836 to mesh. A block 845 extends between the plates 803 and 804 and supports the knife plate 82 and the retainer plate 846 by means of bolts 847 and 848. The plate 846 supports a plurality of spaced vertical pleater bars 850 which alternate with pleater bars 851 supported by a bar 852 extending between plates 802 and 803. As illustrated in FIG. 13, the film passes in a scallop manner between the pleaters 850 and 851 which serve to keep the film stiff so that it can be pushed downwardly by the drive rollers 811 and 812. The pushing action is required since the film is not pulled after it leaves the drive rollers. A sufficient number of the pleaters 850 and 851 are provided so that the complete film width is within the area covered by the pleaters.

The rotation of the knife 83 on the roller 828 causes the blade 83 to come opposite the blade 82 once during each revolution of the blade 83 and at this time the film 62 is cleanly cut across its width. At the time the knives become opposite one another, the paper has been driven down opposite the canvas belt 61 and has been captured against the belt by the coin roll being moved into a cavity in the head by the lifting mechanism 50. Thus, the film is ready to be rolled around the coin in the wrapping head. The knives are driven at the same speed as the shaft 526 since at this speed, two separate pieces of film will be cut for each rotation of the head 60 while the cam 531 drives the plate 501 up and down twice during each rotation of the wrapping head.

SUMMARY

The coin wrapping machine of the present invention provides a device for packaging coins in rolls at a faster rate than is possible with prior devices. The plastic film tightly holds the coins while permitting visual observation of the coins and the final package is sufficiently rigid to be handled by any suitable type of boxing equipment. While the invention has been described in connection with packaging of coins, it is understood that the machine and the various component parts can be used for other purposes. For instance, the wrapping heads could be used to wrap solid cylindrical articles with a plastic film which is sealed at its ends, and the coin conveyor and coin turning sections could be utilized to assemble other articles, such as washers. The conveyor section and the coin turning sections are mounted above the hopper so that even though coins fall away from these sections, they will fall back into the hopper without interfering with the operation of the machine. The use of plastic film provides a much cheaper wrap for the coins than present preformed cartridges which are expensive and bulky to store. Thus, in additional to speeding up the operation of wrapping the coins, each roll of coin can be produced at substantially less cost. The coin turning sections can be sized to handle coins of more than one value, such as nickels and quarters or dimes and pennies, although it is preferable to have a different coin turning section and chute section for each denomination of coin for optimum handling results. Various other modifications are contemplated by those skilled in the art without departing from the spirit and scope of the invention as hereinafter defined by the appended claims.

I claim:
1. A coin wrapping machine comprising:
 hopper means for storing loose coins;
 inclined plate means;
 conveyor means for moving said coins from said hopper means upwardly and depositing said coins on said inclined plate means;
 said inclined plate means positioned over said hopper means so that loose coins that may fall from said inclined plate means are deposited in said hopper means;
 coin turning means connected with said plate means for receiving and turning individual coins on edge and depositing said coins in individual tracks to assemble a roll of loose coins;
 gripping means at the ends of said tracks for holding said roll of loose coins and moving said coins as a roll;

wrapping means for receiving said assembled roll of coins from said gripping means and wrapping a sheet of material around said coins; and means receiving said wrapped roll and sealing the ends of said sheet;

said wrapping means including a cylindrical wrapping head having a cavity therein;

an extensible belt substantially surrounding said head and having fixed ends;

means for placing said sheet of material between said belt and said assembled roll of loose coins;

said gripping means moving said loose coin roll, said sheet and said belt into said cavity.

2. A coin wrapping machine as defined in claim 1 having:

means for rotating said head relative to said belt to wrap said sheet around said coins; and jaw means on said wrapping head for holding said coins in said wrapping head during wrapping of said sheet.

3. A coin wrapping machine as defined in claim 2 wherein:

said sheet extends beyond the end of said coin roll;

finger means mounted on said wrapping head at each end of said cavity; and means for moving said finger means to grip and hold the extended portion of said sheet stationary with respect to said wrapping head in order to twist said sheet at the ends of said coin roll.

4. In a wrapping machine:

a cylindrically-shaped wrapping head having a cavity therein for receiving loose objects;

belt means passing around said wrapping head and contacting said wrapping head and contacting said wrapping head over a portion of its circumference greater than one-half its circumference and having its end fixed;

spring means operative on said belt means for permitting said belt means to extend into said cavity;

means for placing a sheet of film material between said object roll and said belt;

means for inserting said roll into said cavity thereby forcing said belt and sheet into said cavity;

jaw means carried by said wrapping head for holding said object roll in said cavity;

means for rotating said wrapping head to wrap said sheet around said object roll;

a pair of twisting fingers pivotally mounted on said wrapping head at opposite ends of said cavity;

said sheet having edges extending beyond the sides of said wrapping head and between said twisting fingers; and cam means for closing said twisting fingers upon rotation of said wrapping head to grip the edges of said sheet and hold said edges while said sheet is wrapped about said object roll thereby twisting the edges of said sheet.

5. In a wrapping machine as defined in claim 4:

second cam means for controlling the movement of said jaw means;

said second cam means closing said jaw means upon rotation of said wrapping head and holding said jaw closed until said sheet is wrapped around said roll and thereafter holding said jaw means open while said roll is discharged from said head and said cavity is moved to loading position and reloaded.

6. In a wrapping machine as defined in claim 5 wherein said means for rotating said wrapping head comprises:

a Geneva drive mechanism having a continuously rotating drive member;

a driven member intermittently driven by said drive member and having stationary dwell periods for holding said wrapping head stationary in the loading and unloading positions;

the rotation of said head between said positions causing said sheet to be wrapped around said object roll.

7. In a wrapping machine as defined in claim 6 wherein:

said second cam means for controlling said jaw means comprising a rotatable cam track and a cam roller connected with said jaw means;

third cam means for rotating said second cam means during rotation of said wrapping head during wrapping of said roll to maintain said second cam means in fixed position relative to said moving head and hold said jaw means closed during said rotation of said head.

8. In a wrapping machine as defined in claim 4 wherein said cam means for said twisting fingers comprises:

a fixed cam track and cam roller means carried by said twisting fingers;

said cam track closing said fingers during motion of said wrapping head to wrap said sheet around said roll and opening said fingers when said wrapping head reaches the roll discharged location.

9. In a wrapping machine:

a cylindrically-shaped wrapping head having a cavity for receiving a roll of objects;

means for moving said rollers into said wrapping head;

a belt contacting said wrapping head over a portion of its circumference greater than one half of its circumference and covering said cavity as said objects are moved into said wrapping head;

means for feeding a sheet of film material between said roll and said belt as said objects are moved into said cavity;

drive means for continually moving said film material towards said wrapping head; and knife means for cutting said film into sheets after said film is trapped between said objects and said belt during loading of said cavity.

10. In a wrapping machine as defined in claim 9 having:

pleating means for receiving said film upstream of said knife means and for wrinkling said film to make it rigid as it is moved downwardly by said drive means towards said object loading position;

said drive means comprising opposed rollers located upstream of said pleating means;

said pleating means comprising opposed vertical bars which are staggered on opposite sides of said sheet.

11. A wrapping head for a coin wrapping machine comprising:

drum means, a cavity in said drum for receiving a roll of coins;

a fixed belt surrounding said drum and extensible in length;

means for placing a sheet of film material between said roll and said belt as said roll is loaded into said cavity;

jaw means located on said drum for holding said roll within said cavity;

means for rotating said head while said jaw means holds said coins in order to twist said sheet around said coins;

said film material extends beyond said drum at opposite sides of said cavity;

a pair of twisting fingers located at each side of said cavity for engaging said extending portions of said film;

cam means for clamping said twisting fingers against said extending portions upon rotation of said drum to wrap said sheet around said roll of coins and for releasing said fingers from said extending portion after said sheet has been wrapped around said coins.

12. A wrapping head as defined in claim 11 having:

a second cavity in said drum means opposite said first cavity, one of said cavities being in the roll loading position while the other is in the roll discharge position; and cam means for holding said jaw means closed between roll loading and unloading position and hold said jaw means open between unloading and loading position.

13. A wrapping device as defined in claim 12 having:
a pair of twisting fingers located at each side of said second cavity;
said cam means for said twisting fingers holding said twisting fingers for said first cavity closed and said fingers for said second cavity open during movement from loading to unloading position.

14. A coin wrapping machine comprising,
means for assembling a plurality of coins on edge adjacent one another to form a roll of loose coins;
means for moving said roll of loose coins away from said assembly means;
coin wrapping means receiving said roll of loose coins from said moving means and thereafter wrapping a sheet of film material around said coin roll, said coin wrapping means including;
a wrapping head having at least one cavity therein;
an extensible belt substantially surrounding said head,
means for placing said sheet between said belt and said loose roll of coins,
means for urging said roll of coins against said sheet and into said cavity,
means for rotating said wrapping head relative to said belt after receiving said coin roll to wrap said sheet around said coin roll,
jaw means pivotally located on said wrapping head for holding said roll within said cavity,
finger means mounted on said wrapping head at each end of said cavity,
said sheet extending beyond the end of said coin roll at opposite ends of said cavity, and
means for moving said finger means to grip and hold the extending portion of said sheet stationary with respect to said wrapping head in order to twist said sheet at the ends of said coin roll.

15. A coin wrapping machine as defined in caim 14 wherein said finger means includes,
a pair of twisting fingers located at each side of said cavity for engaging the extending ends of said sheets, and cam means for clamping said twisting fingers against said extending ends upon rotation of said wrapping head to wrap said sheet around said roll of coins and for releasing said fingers from said extending ends after said sheet has been wrapped around said coins.

16. A coin wrapping machine as defined in claim 14 wherein said wrapping head is cylindrically-shaped and further comprising;
a second cavity in said wrapping head located opposite said first cavity, one of said cavities in the roll loading position while the other is in the roll discharge position, and
cam means for holding said jaw means closed between roll loading and unloading position and holding said jaw means open between unloading and loading position.

17. A coin wrapping device as defined in claim 16 and further comprising,
a pair of twisting fingers located at each side of said second cavity,
said cam means for said twisting fingers holding said twisting fingers for said cavity closed and said fingers for said second cavity open during movement from loading to unloading position.

18. A coin wrapping machine as defined in claim 14 further comprising,
means for receiving said rolls from said wrapping head, spaced heat-sealing plates, and
means for moving said rolls between said spaced heat sealing plates to heat seal the twisted ends of said roll.

References Cited

UNITED STATES PATENTS

| | | | |
|---|---|---|---|
| 808,955 | 1/1906 | Tucker | 53—215X |
| 1,108,027 | 8/1914 | Thorschmidt | 53—215 |
| 1,484,015 | 2/1924 | Ferguson | 53—215X |
| 1,907,539 | 5/1933 | Hartmann | 53—215X |
| 2,749,692 | 6/1956 | Conti | 53—234 |
| 3,340,882 | 9/1967 | Holmes et al. | 53—212X |
| 3,486,511 | 12/1969 | Salvesen | 133—1 |

FOREIGN PATENTS 317,096 11/1930 Great Britain.

TRAVIS S. McGEHEE, Primary Examiner

N. ABRAMS, Assistant Examiner

U.S. Cl. X.R.

53—215, 217; 133—1 R; 198—152